United States Patent [19]

Egawa et al.

[11] Patent Number: 5,664,070

[45] Date of Patent: Sep. 2, 1997

[54] OUTPUTTING METHOD AND APPARATUS

[75] Inventors: Satoshi Egawa, Kawasaki; Kozo Matsumoto, Yokohama, both of Japan

[73] Assignee: Canon Kabushiki Kaisha, Tokyo, Japan

[21] Appl. No.: 690,944

[22] Filed: Aug. 1, 1996

Related U.S. Application Data

[63] Continuation of Ser. No. 175,185, Dec. 29, 1993, abandoned, which is a continuation of Ser. No. 905,223, Jun. 29, 1992, abandoned, which is a continuation of Ser. No. 676,442, Mar. 28, 1991, abandoned.

[30] Foreign Application Priority Data

Mar. 30, 1990 [JP] Japan ..................................... 2-81395

[51] Int. Cl.$^6$ ..................................................... G06K 15/00
[52] U.S. Cl. ................................................ 395/102; 395/110
[58] Field of Search ..................................... 395/101–102, 395/110, 112, 114, 115, 167, 168, 172, 128, 139; 400/61–62, 70, 76; 382/266, 298, 300–301; 358/444, 451, 470

[56] References Cited

U.S. PATENT DOCUMENTS

| | | | |
|---|---|---|---|
| 4,437,122 | 3/1984 | Walsh et al. | 382/54 |
| 4,878,126 | 10/1989 | Ichikawa | 358/451 |
| 5,005,139 | 4/1991 | Tung | 382/54 |
| 5,025,325 | 6/1991 | Hudson | 358/451 |
| 5,072,168 | 12/1991 | Ferguson | 364/485 |
| 5,093,903 | 3/1992 | Sadoh et al. | 395/110 |
| 5,119,471 | 6/1992 | Kagaya et al. | 395/110 |
| 5,157,417 | 10/1992 | Anzai | 358/298 |

Primary Examiner—Arthur G. Evans
Attorney, Agent, or Firm—Fitzpatrick, Cella, Harper & Scinto

[57] ABSTRACT

An outputting apparatus comprises: a changing circuit to change a bit map font in accordance with a resolution of an outputting mechanism in the case where a resolution of the bit map font to be generated differs from the resolution of the outputting mechanism; a developing circuit to develop dot pattern information of the bit map font changed by the changing circuit; and an outputting device to output the dot pattern information developed by the developing means. The changing circuit executes a smoothing process by interpolating one dot into a zigzag portion of a character pattern. The bit map font is a down-load font.

45 Claims, 5 Drawing Sheets

⟨300DPI⟩

⟨× 2⟩

⟨× 2 + SMOOTHING⟩

OUTPUTTING METHOD AND APPARATUS

This application is a continuation of application Ser. No. 08/175,185 filed Dec. 29, 1993, now abandoned, which was a continuation of application Ser. No. 07/905,223 filed Jun. 29, 1992, now abandoned, which was a continuation of application Ser. No. 07/676,442 filed Mar. 28, 1991, now abandoned.

BACKGROUND OF THE INVENTION

1. Field of the Invention

The present invention relates to a printing apparatus and, more particularly, to a printing apparatus which develops dot pattern information of bit map fonts in accordance with text information such as character codes or the like and prints by a printer mechanism.

2. Related Background Art

Hitherto, in a printing apparatus such as a laser beam printer or the like, when text information comprising character codes or the like is supplied from a host computer or the like, dot pattern information of bit map fonts is developed in accordance with the text information and is printed by a printer mechanism.

A construction and operations of a conventional printing apparatus will be described hereinbelow with reference to a schematic block diagram shown in FIG. 5.

In the diagram, reference numeral 101 denotes an input controller for receiving and controlling text data 121 such as character codes or the like which are sent from the host computer; 102 a page memory to temporarily store the input text data; 103 a character pattern generator in which dot pattern information such as character codes and the like have been stored; 106 a main controller to control the whole apparatus; 107 an ROM in which a processing procedure (program) of the main controller 106 has been stored; 108 a work RAM which is used when executing the process; 109 a bit map memory to store the converted dot pattern information; 110 a parallel-to-series converter to convert the parallel dot pattern information into serial image data 122; and 111 a timing controller to control an output of the image data 122 in accordance with a sync signal 123 which is sent from a printer mechanism 112.

In the above construction, the main controller 106 controls the entire apparatus in accordance with the program stored in the ROM 107. The text data 121 such as character codes or the like which are sent from the host computer or the like is supplied from the input controller 101 and is temporarily stored into the page memory 102. The text data stored in the page memory 102 is sequentially read out from the head. By referring to the character pattern generator 103, the read-out text data is developed into the dot pattern information and stored into the bit map memory 109.

When the sync signal 123 is supplied from the printer mechanism 112, the timing controller 111 sequentially reads out the dot pattern information in the bit map memory 109 from the head. The read-out parallel dot pattern information is converted into the serial data by the P/S converter 110 and, after that, it is sent to the printer mechanism 112 as image data 122 and is printed.

However, in the above conventional apparatus, in the case where a bit map font of a resolution different from a resolution of the printer mechanism is used as a character pattern generator, there is a drawback such that if it is printed as it is, a size of character or the like changes (for instance, in the case where the resolution of the printer mechanism is equal to 600 dpi, if a bit map font of 300 dpi is used, a size of printed character is reduced into ½).

SUMMARY OF THE INVENTION

The invention is made to solve the above problems in consideration of the above points and it is an object of the invention to provide outputting method and apparatus in which in the case where a resolution of bit map font is different from that of an output mechanism, by enlarging or reducing the bit map font, it is prevented that a size of character changes upon output, thereby making it possible to output at a higher quality.

In consideration of the above points, another object of the invention is to provide outputting method and apparatus which can change a down-load font in accordance with a resolution of an output mechanism and can store.

In consideration of the above points, still another object of the invention is to provide an outputting apparatus in a printing apparatus which develops dot pattern information of bit map fonts in accordance with text information such as character codes or the like and prints by a printer mechanism, comprising: changing means for changing the bit map font in accordance with a resolution of the printer mechanism in the case where a resolution of bit map font differs from the resolution of the printer mechanism; developing means for developing dot pattern information of the bit map font which has been changed by the changing means; and printing means for printing the dot pattern information developed by the developing means.

In consideration of the above points, further another object of the invention is to provide an outputting method or apparatus in which in the case where a resolution of bit map fonts corresponding to text information such as character codes or the like differs from a resolution of an output mechanism, the bit map font is changed in accordance with the resolution of the output mechanism and dot pattern information of the changed bit map font is developed and generated.

DETAILED DESCRIPTION OF THE PREFERRED EMBODIMENT

A preferred embodiment according to the invention will be described in detail hereinbelow with reference to the drawings.

<Description of construction (FIGS. 1 and 2)>

Figure 1:
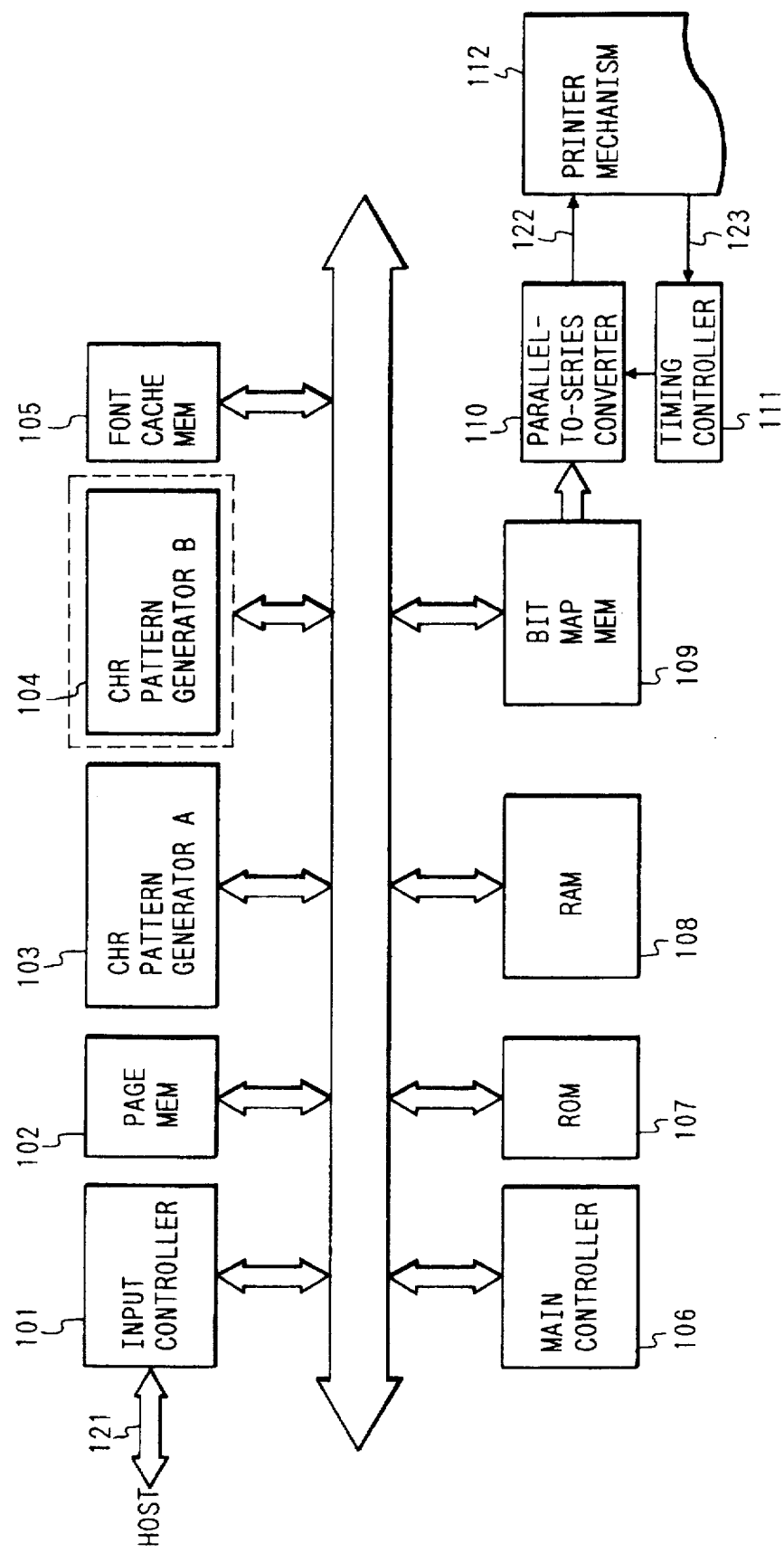
FIG. 1 is a schematic block diagram showing a construction of a printing apparatus according to an embodiment.

FIG. 1 is a schematic block diagram showing a construction of a printing apparatus according to the embodiment. In the diagram, reference numeral 101 denotes the input controller to execute an interface control when the text data 121 is supplied from the host computer or the like; 102 the page memory to temporarily store the supplied text data 121; 103 the character pattern generator A which is installed as a standard device in the apparatus and in which dot pattern information for, e.g., 600 dpi has been stored; and 104 a character pattern generator B which is detachably installed as an optional device in the apparatus and in which dot pattern information for, e.g., 300 dpi has been stored.

Figure 2:
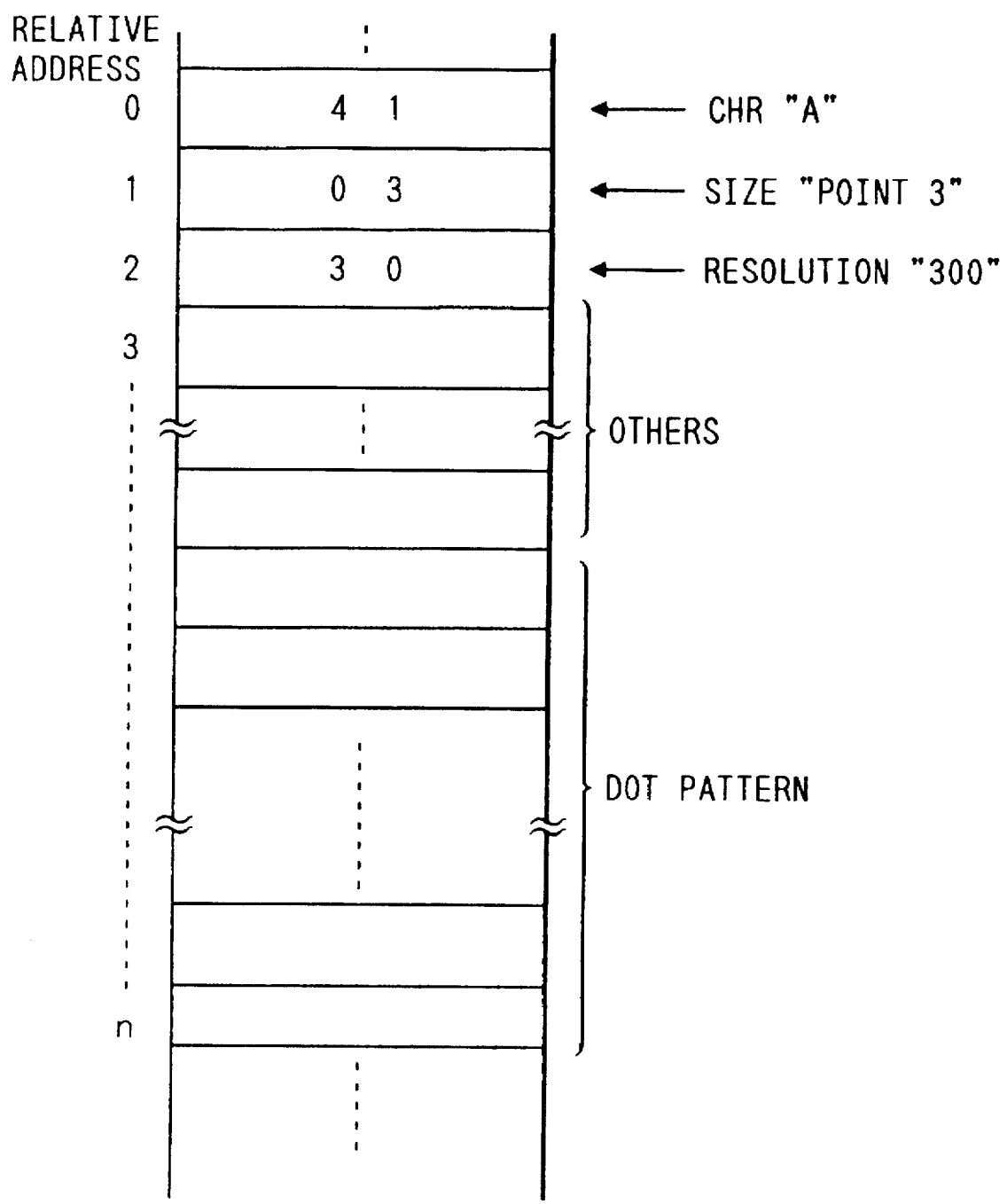
FIG. 2 is a diagram showing dot pattern information stored in a character pattern generator.

FIG. 2 shows an example of a construction of the above dot pattern information. Code data "41" (hexadecimal notation) indicative of a character "A", data "03" (hexadecimal notation) indicative of a size of "point 3", data "30" (hexadecimal notation) indicative of a resolution, and a dot pattern are sequentially stored from the head address, respectively. The other characters are also constructed in a manner similar to the above.

Reference numeral 105 denotes a font cache memory to temporarily store font information; 106 the main controller to control the entire apparatus in accordance with a processing procedure (program), which will be explained hereinlater; 107 the ROM in which the processing procedure of the main controller 106 has been stored; 108 the RAM comprising a work area which is used when the main controller 106 executes various processes, various tables, and the like; 109 the bit map memory to store the developed dot pattern information; 110 the parallel-to-series converter to convert the parallel dot pattern information developed in the bit map memory 109 into the serial image data 122; and 111 the timing controller for receiving the sync signal 123 from the printer controller 112 having a resolution of 600 dpi and controlling the timing of the image data 122 which is generated.

<Explanation of processing procedure (FIG. 3)>

A processing procedure of the printing apparatus in the embodiment will now be described hereinbelow in accordance with a flowchart shown in FIG. 3.

First, in step S1, if the input controller 101 has received the text data 121 such as character codes or the like sent from the host computer or the like, step S2 follows. In step S2, the input text data 121 is once stored into the page memory 102. In the next step S3, the characters stored in the page memory 102 are sequentially read out from the head and are compared with the code data of the dot pattern information stored in the pattern generator A 103 or B 104, thereby obtaining the font of the coincident character.

For instance, if the text data which has been read out of the page memory 102 indicates "A" of a size of point 3 in the pattern generator B 104, it coincides with the dot pattern information shown in FIG. 2 and the resolution is equal to 300 dpi.

In the next step S4, a resolution of a font is checked. If it is equal to the resolution (600 dpi in the example) of the printer mechanism 112, step S8 follows and a process to develop the dot pattern into the bit map memory is executed. However, if the resolution differs, the processing routine advances to step S5 and the dot pattern which has been read out is enlarged by two times in both of the vertical and lateral directions in accordance with the resolution of the printer mechanism 112. After completion of the enlarging process, step S6 follows and the enlarged dot pattern is subjected to a process (hereinafter, referred to as a smoothing process) to interpolate one dot to a zigzag portion corresponding to two dots appearing in an oblique line, a curve, or the like.

Figure 4A:
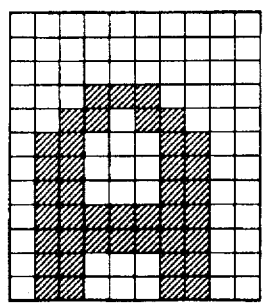
FIG. 4A is a diagram showing a state in the case where a dot pattern of 300 dpi has been developed.
Figure 4B:
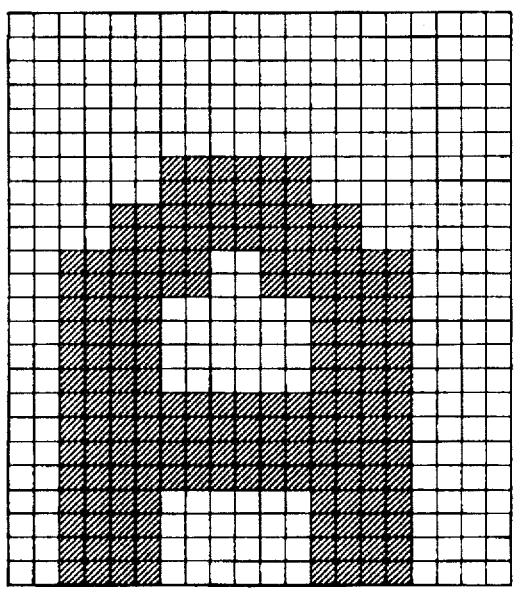
FIG. 4B is a diagram showing a state in the case where the dot pattern of FIG. 4A has been enlarged by two times.
Figure 4C:
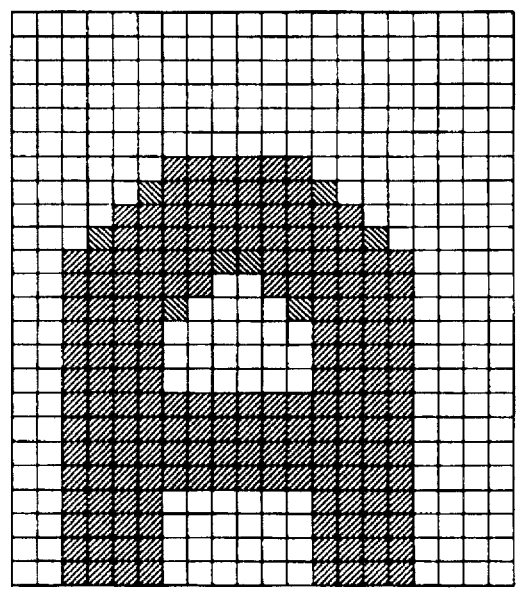
FIG. 4C is a diagram showing a state in the case where a smoothing process has been executed to the dot pattern of FIG. 4B.
Figure 5:
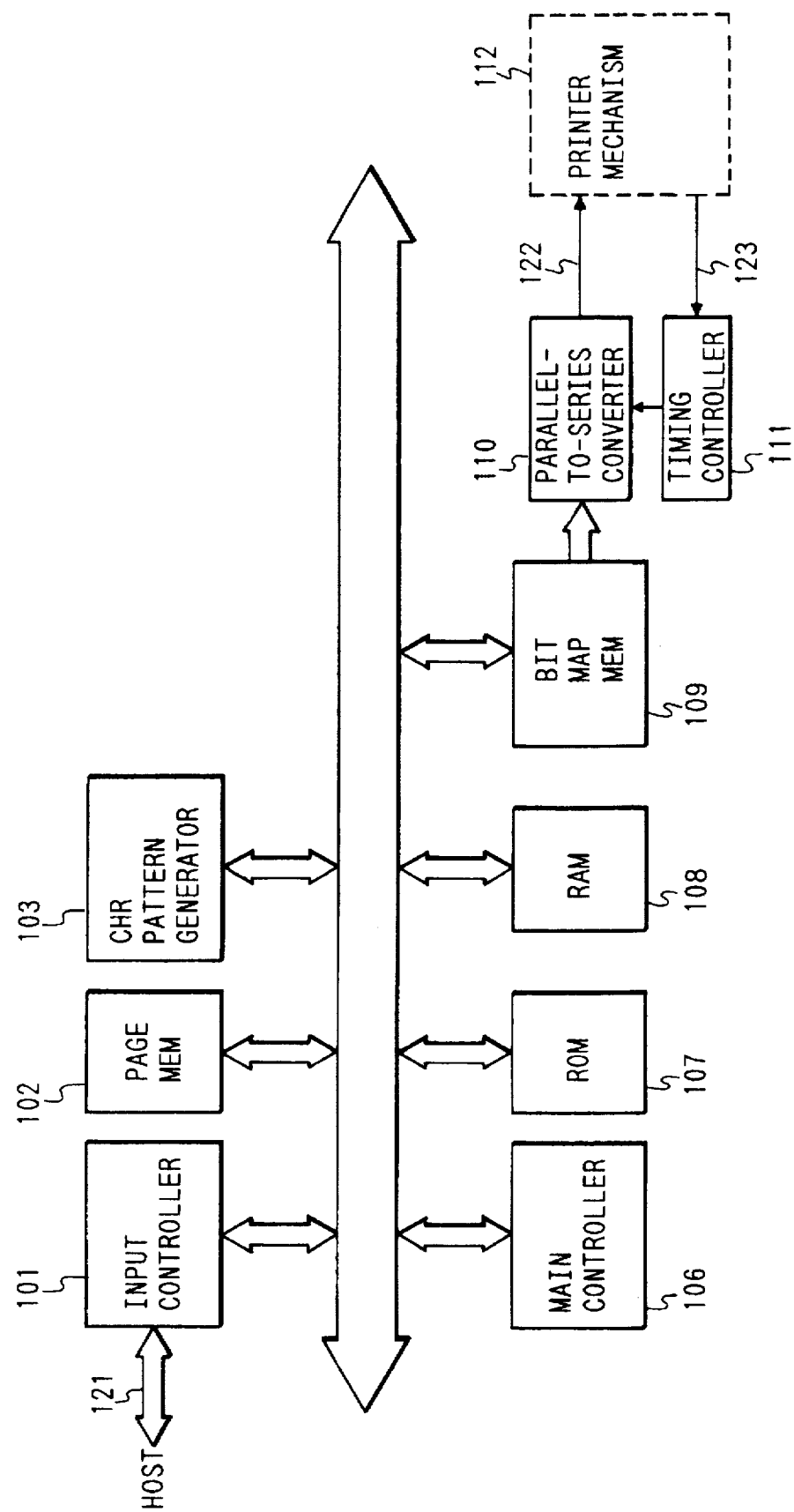
FIG. 5 is a block diagram showing a construction of a conventional apparatus.

FIGS. 4A to 4C show an example of the foregoing character "A". FIG. 4A shows a state in the case where the dot pattern information of 300 dpi has been developed as it is. FIG. 4B shows a state in the case where the dot pattern of 300 dpi has been enlarged by two times in both of the vertical and lateral directions. FIG. 4C shows a state in the case where one dot has been interpolated to the zigzag portion (dots of the mesh point portions).

After completion of the above smoothing process, step S7 follows and the smoothed dot pattern is once stored into the font cache memory 105. The reason why the smoothed dot pattern is temporarily stored into the font cache memory 105 is to reduce the time which is required to form the dot pattern information of one page by omitting the processes in steps S5 and S6 when the same character is subsequently supplied.

In step S8, the dot pattern is developed into the bit map memory 109. In the next step S9, a check is made to see if the dot pattern of one page has been developed into the bit map memory 109 or not. If the process of one page is not completed yet, the processing routine is returned to step S3 and the above processes are repeated. After completion of the process of one page, the processing routine advances to step S10 and a print start signal (not shown) is supplied to the printer mechanism 112 and the ordinary printing process is started.

In the printing process, when the timing controller 111 receives the sync signal 122 from the printer mechanism 112, the dot patterns developed in the bit map memory 109 are sequentially read out from the head. After the read-out parallel dot pattern was converted into the serial data by the parallel-to-series converter 110, it is supplied as image data 122 to the printer mechanism and is printed.

As described above, according to the embodiment, when the dot pattern is formed from the character code or the like, by changing the process in accordance with a difference of the character pattern generator, the printing of a high quality can be performed even if the resolution of the printer mechanism differs from the resolution of the character pattern generator. The invention can be also applied to a printing apparatus in which detachable character pattern generators which are used as optical devices have different resolutions.

As described above, according to the invention, in the case where a resolution of bit map font differs from the resolution of the printer mechanism, by enlarging or reducing the bit map font, it is prevented that a size of character upon printing changes. It is possible to print at a higher quality.

Even in the case of down-loading font data from the outside, similar processes can be executed. For instance, in FIG. 1, the resolution information written in the head of a down-load font which is transferred through the text data 121 is compared with the resolution of the printer mechanism. If they coincide, the download font is supplied as it is and stored into, for example, the RAM 108, cache memory 105, a disk (not shown), or the like.

Figure 3:
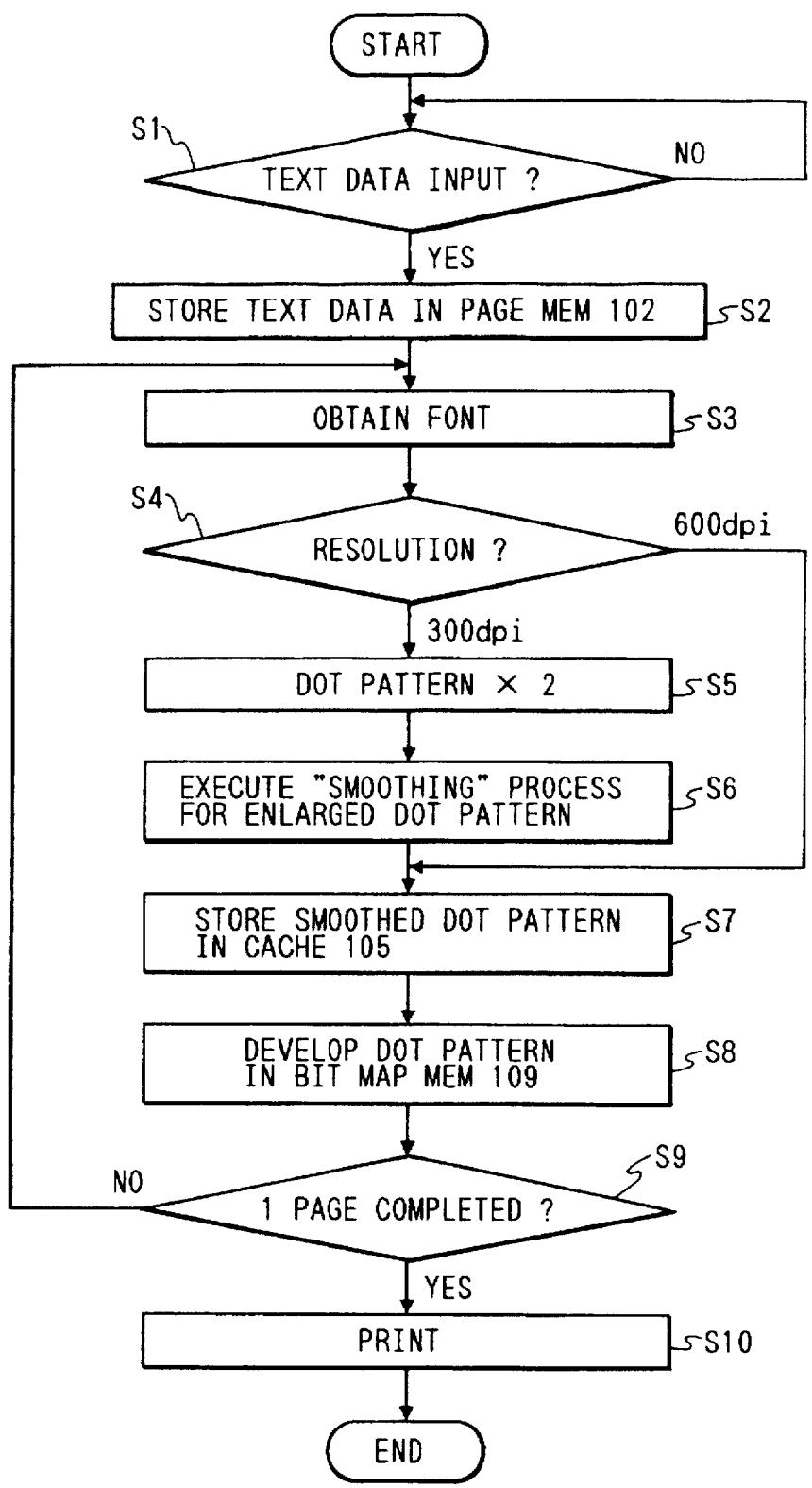
FIG. 3 is a flowchart showing a processing procedure in the embodiment.

However, if those resolutions differ, a variable magnifying process and a smoothing process are executed to the dot pattern in steps similar to steps S5 and S6 in FIG. 3, thereby matching the resolution of the bit map font with the resolution of the printer mechanism. After that, the dot pattern is stored in a manner similar to the above. Thus, the down-load font pattern which is adapted to the apparatus can be stored and used in a state in which it has been made correspond to the code information corresponding to the pattern.

We claim:

1. An output control apparatus comprising:
reading means for reading resolution information stored together with character patterns in a character pattern memory means;

determining means for determining whether a resolution indicated by the resolution information read by said reading means is a first resolution or a second resolution; and converting means (1) for converting character patterns corresponding to input text data into bit map data using the character patterns stored in the character pattern memory means, if said determining means determines that the resolution is the first resolution, and (2) for changing the size of the character patterns stored in the character pattern memory means to adapt to the first resolution, for smoothing the size-changed character patterns, and for converting character patterns corresponding to input text data into bit map data using the size-changed and smoothed character patterns if said determining means determines that the resolution is the second resolution.

2. An apparatus according to claim 1, further comprising means for outputting the character pattern converted by said converting means.

3. An apparatus according to claim 2, wherein said output means comprises a laser beam printer.

4. An apparatus according to claim 1, further comprising a host computer which supplies the document data to said input means.

5. An apparatus according to claim 1, wherein said converting means applies the smoothing processing to the character pattern by interpolating a dot at corners of the character pattern.

6. An apparatus according to claim 1, further comprising cache memory for storing the character pattern converted by said converting means.

7. An apparatus according to claim 1, wherein the first resolution is determined on the basis of resolution information of output means for outputting the character patterns converted by said converting means.

8. An apparatus according to claim 1, wherein the character pattern memory means is provided in a font cartridge detachably attached to said apparatus.

9. A method to control outputting in an output control apparatus, comprising the steps of:

reading resolution information stored together with character patterns in a character pattern memory;

determining whether a resolution indicated by the read resolution information is a first resolution or a second resolution;

converting character patterns corresponding to input text data into bit map data using the stored character patterns if said determining step determines that the resolution is the first resolution; and changing the size of the stored character patterns in the character pattern memory to adapt to the first resolution, smoothing the size-changed character patterns, and converting character patterns corresponding to input text data into bit map data using the size-changed character patterns if said determining step determines that the resolution is the second resolution.

10. A method according to claim 9, further comprising the step of outputting the character pattern converted in said converting step.

11. A method according to claim 10, wherein the character pattern is output on a laser beam printer.

12. A method according to claim 9, further comprising the step of supplying the document data from a host computer.

13. A method according to claim 9, wherein in said converting step the smoothing processing is applied to the character pattern by interpolating a dot at corners of the character pattern.

14. A method according to claim 9, further comprising the step of storing the character pattern converted in said converting step in a cache memory.

15. A method according to claim 9, wherein the first resolution is determined on the basis of resolution information for outputting the character patterns converted in said converting step.

16. A method according to claim 15, wherein the determination is made depending on whether the resolution information stored together with the character pattern is identical to the resolution information being output.

17. A method according to claim 9, wherein the character pattern memory is provided in a font cartridge detachably attached to said apparatus.

18. A method according to claim 9, wherein in said converting step, the character pattern is converted in the bit map memory without changing the size of the character in a case where said determining step determines that the character pattern is not to be size-changed.

19. An output apparatus comprising:

reading means for reading resolution information stored together with character patterns in a character pattern memory means;

determining means for determining whether a resolution indicated by the resolution information read by said reading means is a first resolution or a second resolution;

converting means for (1) converting character patterns corresponding to input text data into bit map data using the character patterns stored in the character pattern memory means, if said determining means determines that the resolution is the first resolution, and for (2) changing the size of the character patterns stored in the character pattern memory means to adapt to the first resolution, and for converting character patterns corresponding to input text data into bit map data using the size-changed character patterns, if said determining means determines that the resolution is the second resolution; and output means for outputting the character pattern converted by said converting means.

20. An apparatus according to claim 19, wherein said output means comprises a laser beam printer.

21. An apparatus according to claim 19, further comprising a host computer which supplies the text data to said apparatus.

22. An apparatus according to claim 19, further comprising a cache memory for storing the character pattern converted by said converting means.

23. An apparatus according to claim 19, wherein the first resolution is determined on the basis of resolution information of said output means.

24. An apparatus according to claim 19, wherein the character pattern memory is provided in a font cartridge detachably attached to said apparatus.

25. A method to control outputting in an output control apparatus, comprising the steps of:

reading resolution information stored together with character patterns in a character pattern memory;

determining whether a resolution indicated by the read resolution information is a first resolution or a second resolution;

converting character patterns corresponding to input text data into bit map data using the stored character patterns if said determining step determines that the resolution is the first resolution;

changing the size of the stored character patterns in the character pattern memory to adapt to the first resolution, and converting character patterns corresponding to input text data into bit map data using the size-changed character patterns if said determining step determines that the resolution is the second resolution; and outputting the converted character patterns.

26. A method according to claim 25, wherein said outputting step outputs the character pattern with a laser beam printer.

27. A method according to claim 25, further comprising the step of supplying the text data from a host computer.

28. A method according to claim 25, further comprising the step of storing the converted character pattern in a cache memory.

29. A method according to claim 25, wherein the first resolution is determined on the basis of resolution information in said outputting step.

30. A method according to claim 25, wherein the character pattern memory is provided in a font cartridge detachably attached to the apparatus.

31. A method according to claim 25, wherein in said converting step, the character pattern is converted in the bit map memory without changing the size of the character in a case where said determining step determines that the character pattern is not to be size-changed.

32. A storage medium for storing a program carried out in an output control apparatus, with the program comprising the steps of:

reading resolution information stored together with character patterns in a character pattern memory;

determining whether a resolution indicated by the read resolution information is a first resolution or a second resolution;

converting character patterns corresponding to input text data into bit map data using the stored character patterns if said determining step determines that the resolution is the first resolution;

changing the size of the stored character patterns in the character pattern memory to adapt to the first resolution, and converting character patterns corresponding to input text if said determining step determines that the resolution is the second resolution; and outputting the converted character patterns.

33. A storage medium according to claim 32, wherein said outputting step outputs the character pattern with a laser beam printer.

34. A storage medium according to claim 32, wherein the program further comprises the step of supplying the text data from a host computer.

35. A storage medium according to claim 32, wherein the program further comprises the step of storing the converted character pattern in a cache memory.

36. A storage medium according to claim 32, wherein the first resolution is determined on the basis of resolution information in said outputting step.

37. A storage medium according to claim 32, wherein the character pattern memory is provided in a font cartridge detachably attached to the apparatus.

38. A storage medium according to claim 32, wherein in said converting step, the character pattern is converted in the bit map memory without changing the size of the character in a case where said determining step determines that the character pattern is not to be size-changed.

39. A program product carried out in an output control apparatus, comprising the steps of:

reading resolution information stored together with character patterns in a character pattern memory;

determining whether a resolution indicated by the read resolution information is a first resolution or a second resolution;

converting character patterns corresponding to input text data into bit map data using the stored character patterns if said determining step determines that the resolution is the first resolution;

changing the size of the stored character patterns in the character pattern memory to adapt to the first resolution, and converting character patterns corresponding to input text data into bit map data using the size-changed character patterns if said determining step determines that the resolution is the second resolution; and outputting the converted character patterns.

40. A program product according to claim 39, wherein said outputting step outputs the character pattern with a laser beam printer.

41. A program product according to claim 39, further comprising the step of supplying the text data from a host computer.

42. A program product according to claim 39, further comprising the step of storing the converted character pattern in a cache memory.

43. A program product according to claim 39, wherein the first resolution is determined on the basis of resolution information in said outputting step.

44. A program product according to claim 39, wherein the character pattern memory is provided in a font cartridge detachably attached to the apparatus.

45. A program product according to claim 39, wherein in said converting step, the character pattern is converted in the bit map memory without changing the size of the character in a case where said determining step determines that the character pattern is not to be size-changed.

* * * * *